United States Patent Office 3,463,424
Patented Aug. 26, 1969

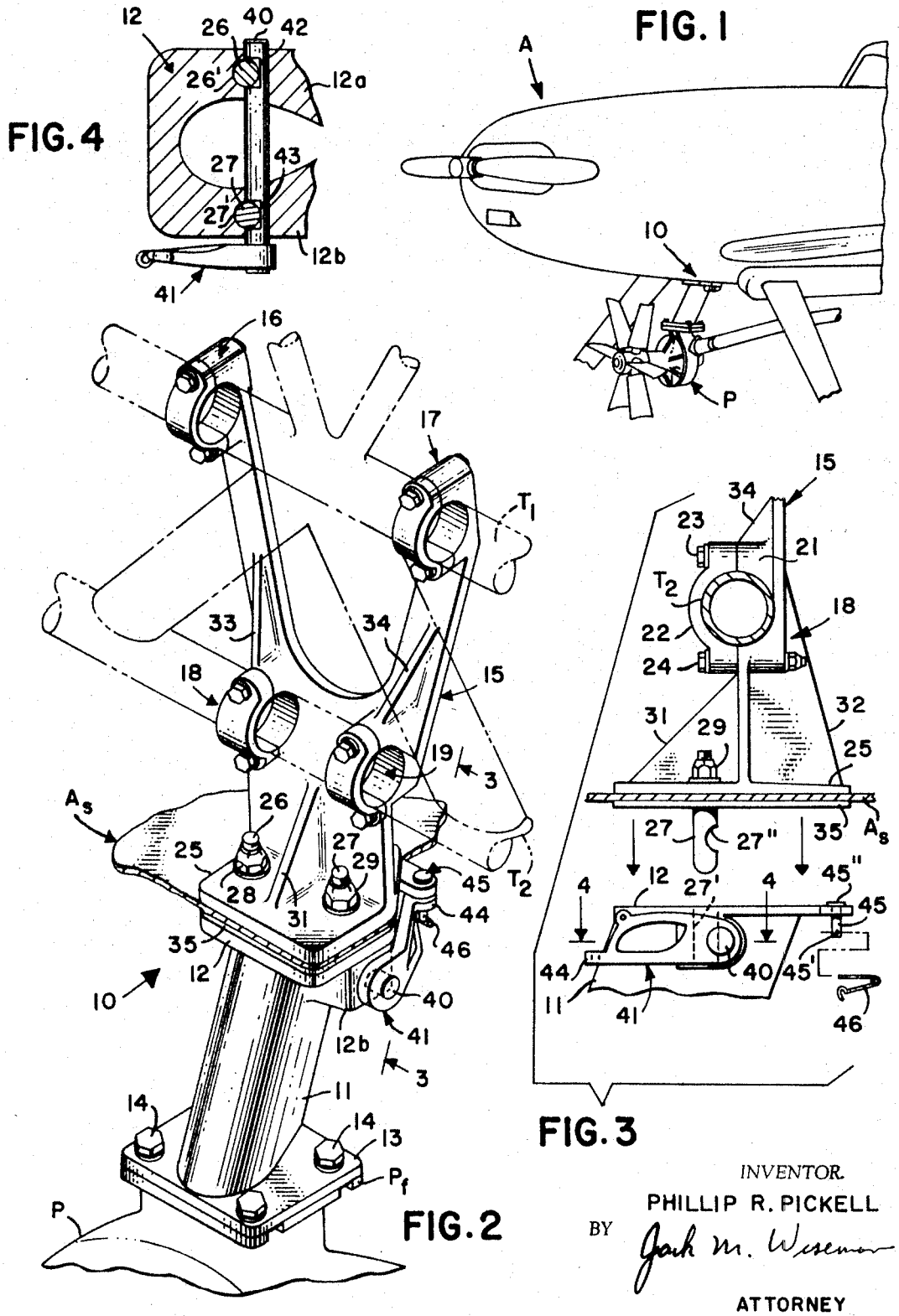

3,463,424
QUICK DISCONNECT MECHANISM FOR SECURING AUXILIARY EQUIPMENT TO AN AIRCRAFT
Phillip R. Pickell, Las Vegas, Nev., assignor to Agricultural Aviation Engineering Company, Las Vegas, Nev., a corporation of California
Filed Feb. 23, 1968, Ser. No. 707,665
Int. Cl. B64d 1/00, 47/00
U.S. Cl. 244—131                                5 Claims

ABSTRACT OF THE DISCLOSURE

A quick disconnect mechanism in which a fork mount is fixedly secured inside of an aircraft with a flange positioned against the inside surface of the aircraft skin. A pair of stud members secured to this flange project outside through the skin. The fork mounted stud members are releasably engaged inside passageways formed on opposite sides of a mating flange at one end of an aerodynamically-stabilized pylon. The other end of the pylon is fixedly secured to the auxiliary equipment. A locking shaft disposed transverse to the stud members is rotatably mounted in the pylon flange. In the open position of rotation of the locking shaft, recesses in the shaft circumscribe the stud member passageways so that the pylon flange is free to move relative to the stud members. And in the locked position of rotation, non-recessed solid portions of the locking shaft are seated in conforming recesses of the stud members, thereby retaining the stud members in the passageways when it is desired to secure the auxiliary equipment to the aircraft. When it is desired to remove this auxiliary equipment, the locking shaft is rotated back to the open position and the pylon flange can be quickly withdrawn from the fork mounted stud members.

---

The present invention relates in general to a mechanism for securing auxiliary equipment to an aircraft, and more particularly to a mechanism which is adapted to permit quick disconnection of such auxiliary equipment.

Many applications of aircraft require auxiliary equipment to be temporarily secured to the outside of the aircraft. One example of such auxiliary equipment is spraying equipment used in aerial crop dusting operations. For economical use of aircraft in such applications, it is necessary that a quick disconnect mechanism be provided which reliably secures the auxiliary equipment to the aircraft and yet permits such equipment to be rapidly installed and removed as desired.

One object of the present invention is the provision of an improved quick disconnect mechanism for securing auxiliary equipment to an aircraft.

Another object of the present invention is the provision of a quick disconnect mechanism which is simple and inexpensive, and yet is capable of reliable operation under heavy loading conditions.

Generally speaking, these objects are attained in accordance with the present invention by the provision of a quick disconnect mechanism in which at least one stud member is fixedly secured to the aircraft and projects outwardly therefrom into the passageway of a mating member fixedly secured to the auxiliary equipment, and a locking shaft is rotatably mounted with respect to the mating member so that in an open position of rotation the mating member is free to move with respect to the stud member, and in a closed position of rotation the mating member is retained with respect to the stud member.

These and other objects, features and advantages of the present invention will become more apparent upon a consideration of the following specification, taken in connection with the accompanying drawing, wherein:

FIGURE 1 is a perspective view of the forward end of an aircraft equipped with a quick disconnect mechanism in accordance with the present invention;

FIGURE 2 is an enlarged perspective view of the quick disconnect mechanism of FIGURE 1, shown with the mechanism in the locked position;

FIGURE 3 is an exploded cross-sectional view taken along line 3—3 in FIGURE 2, but shown with the mechanism in the open position; and FIGURE 4 is a cross-sectional view taken along line 4—4 in FIGURE 3.

Referring to FIGURE 1, a standard aircraft A, the forward end thereof being shown, has a fan-driven pump assembly P mounted on the bottom thereof as auxiliary equipment. The pump P may be of a type commonly used for aerial spraying of insecticides, fungicides and the like. To facilitate field operation of such spraying equipment, it is essential that it can be quickly and reliably connected and disconnected from the aircraft A. In accordance with the present invention, a novel quick-disconnect mechanism 10 is provided for this purpose, said mechanism being shown in detail in FIGURE 2. Whereas the illustrated embodiment discloses a spraying pump as the particular piece of auxiliary equipment mounted to the aircraft by means of a quick-disconnect mechanism in accordance with the present invention, it will be readily understood by those skilled in the art that said mechanism may be used with any auxiliary equipment for which a quick-disconnect mounting is desired.

Referring now to FIGURE 2, the quick-disconnect mechanism 10 includes an aerodynamically-stabilized post or pylon 11 having an upper flange 12 and a lower flange 13. The pylon 11 projects downwardly from a portion $A_s$ of the outer skin of the aircraft A, and the pump assembly P is attached to the bottom of the pylon 11 by bolts 14 inserted through the bottom flange 13 and a mating flange $P_f$ of the pump P.

Inside of the aircraft A, a fork mount 15 is secured to aircraft structural tubes $T_1$ and $T_2$ by means of ring clamps 16, 17, 18 and 19. The construction of each of these ring clamps is substantially the same as that shown for the clamp 18 in FIGURE 3. A partial ring 21 is formed integrally with the body of the fork mount 15 which may, for example, be made from cast aluminum. The partial ring 21 is seated around part of the perimeter of the aircraft tube $T_2$. A ring member 22 is seated around the remaining portion of the tube perimeter, and is bolted by means of bolts 23 and 24 to an abutting boss portion of the body ring 21.

The bottom of the fork mount 15 is formed into a flange 25 which abuts the inside surface of the aircraft skin $A_s$. The flange 25 has two cylindrical stubs 26 and 27 which project downwardly therefrom. The tops of the studs 26 and 27 are secured to the flange 25 by respective lock nuts 28 and 29 screwed to threads formed at the tops of these studs. In order to strengthen the fork mounting member 15, a reinforcing web 31 is formed between the front of the bottom flange 25 and the main body, a reinforcing web 32 is formed between the rear of the bottom flange 25 and the main body, a reinforcing web 33 is formed between the ring clamp 18 and the main body, and a reinforcing web 34 is formed between the ring clamp 19 and the main body.

The studs 26 and 27 project downwardly from the fork mount flange 25 into respective conforming cylindrical passageways 26' and 27' in respective downwardly-projecting bosses 12a and 12b formed in the flange 12 of the pylon 11. These studs are releasably secured in the respective channels so that the conforming flanges 12 and 25 exert compression on a sealing gasket 35 and provide a secure mounting to the aircraft skin $A_s$ for the pylon 11.

Each of the studs 26 and 27 has a cylindrical recess formed in the side surface thereof in order to provide a passageway for a rotatable cylindrical locking shaft 40 extending through the flange bosses 12a and 12b traversely to said studs. As is best seen in FIGURE 4, the axes of the cylindrical members 26 and 27 are substantially parallel and the axis of the cylindrical member 40 extends in a direction substantially perpendicular to the axes of the cylindrical members 26 and 27. The outer surface of the cylindrical member 40 is disposed in partially intersecting relationship relative to the outer surfaces of the cylindrical members 26 and 27, with the axis of the cylindrical member 40 being off-set from the axes of the cylindrical members 26 and 27. The recess 27" in the stud 27 is seen in FIGURE 3, it being understood that the recess in the stud 26 is of the same configuration.

In order to facilitate the manual rotation of the shaft 40, a handle 41 is fixed to one end thereof. The shaft 40 has a pair of notches or recesses 42 and 43 in the side surfaces thereof such that when the handle 41 is rotated to a certain position, as shown in FIGURES 3 and 4, the recesses 42 and 43 substantially circumscribe the overlapping portions of the shaft 40 with the studs 26 and 27, and the studs 26 and 27 are free to move axially in the respective passageways 26' and 27'. This position of the handle 41 shall be referred to as the "open" position. If the handle 41 is rotated 180° from the open position, as shown in FIGURE 2, the solid part of the shaft 40 occupies a substantial part of said overlapping portions of the shaft 40 with the studs 26 and 27, said solid part of the shaft 40 being seated in the cylindrical recesses of the studs 26 and 27, thereby fixedly securing the studs 26 and 27 in the respective passageways 26' and 27'. This position of the handle 41 shall be referred to as the "locked" position. The handle 41 has a flange 44 formed at the end thereof which mates with the pylon flange 12 when the handle 41 is in the closed position. A pin 45, inserted through mating holes in the flanges 12 and 44, has a transverse passageway 45' formed therethrough near the lower end of the pin 45 and below the flange 44 when the handle 41 is in the locked position as shown in FIGURE 2. The upper end of the pin has a head 45" formed therein in order to prevent the pin 45 from passing downward through the flange 12. Finally a safety pin 46 is inserted through the transverse passageway 45' in the pin 45 in order to retain the handle 41 in the locked position.

In operation, the auxiliary pump P is attached to the aircraft A by first rotating the handle 41 to the open position and then mating the pylon flange 12 to the fork mount studs 26 and 27 projecting downwardly from the aircraft skin $A_s$. The handle 41 is then rotated to the locked position and retained in said position by inserting the safety pin 46 through the opening 45' of the pin 45. The pump P may thereafter be quickly removed from the aircraft A by removing the safety pin 46, rotating the handle 41 back to the open position, and then withdrawing the pylon flange 12 from the fork mount studs 26 and 27.

It is to be understood that modifications and variations of the embodiments of the invention disclosed herein may be resorted to without departing from the spirit of the invention.

Having thus described my invention, what I claim as new and desire to protect by Letters Patent is:

1. A quick disconnect mechanism for securing auxiliary equipment to an aircraft, comprising: at least one stud member adapted to be fixedly secured to said aircraft and projecting outwardly therefrom; mating means adapted to be fixedly secured to said auxiliary equipment, said mating means having a passageway therein through which said stud member is inserted; and a locking shaft extending through said mating means in rotatable relationship therewith, said locking shaft being disposed in partially overlapping relationship relative to said stud member, said stud member having a recess through the side surface thereof in order to permit the insertion of said locking shaft through said stud member, and said locking shaft having a recess in the side surface thereof such that when said locking shaft is rotated into one position said recess circumscribes said stud member so as to permit free movement of said mating means relative to said stud member and when said locking shaft is rotated into another position a portion of said locking member not having said recess therein is seated in the recess of said stud member to thereby lock said mating means relative to said stud member, said stud member being attached at the inward end thereof to a first flange member adapted to be positioned against the inside surface of the skin of said aircraft with said stud member projecting outwardly through said skin, and said mating means including a second flange member adapted to be positioned against the outside surface of the skin of said aircraft in cooperating relationship relative to said first flange member.

2. A quick disconnect mechanism according to claim 1 wherein said passageway for said stud member is formed in said second flange member, and said locking shaft is rotatably mounted in said second flange member.

3. A quick disconnect mechanism according to claim 1 wherein said first flange member is formed at the end of a fork mounting, said fork mounting being adapted to be secured to aircraft structural elements inside of said aircraft.

4. A quick disconnect mechanism according to claim 1 wherein said second flange member is formed at one end of a pylon member, the other end of said pylon member being adapted to be fixedly secured to said auxiliary equipment.

5. A quick disconnect mechanism according to claim 4 wherein two of said stud members project from said first flange member in cooperative relationship with two of said stud member passageways, said two passageways being positioned in said second flange member on opposite sides of said pylon member.

References Cited

UNITED STATES PATENTS

| | | |
|---|---|---|
| 1,387,191 | 8/1921 | Silver. |
| 1,707,894 | 4/1929 | Bergesen _____ 248—220.5 X |
| 2,570,240 | 10/1951 | Houghton _____ 244—129 X |

MILTON BUCHLER, Primary Examiner

JAMES E. PITTENGER, Assistant Examiner

U.S. Cl. X.R.

244—135, 136; 248—220.5